(12) United States Patent
Chadbourne et al.

(10) Patent No.: US 8,489,782 B2
(45) Date of Patent: Jul. 16, 2013

(54) DETECTING ACCESSORIES ON AN AUDIO OR VIDEO JACK

(75) Inventors: Peter Chadbourne, Portland, ME (US); Gregory A. Maher, Cape Elizabeth, ME (US); James A. Siulinski, Westbrook, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/584,465

(22) Filed: Aug. 13, 2012

(65) Prior Publication Data

US 2012/0326736 A1   Dec. 27, 2012

Related U.S. Application Data

(63) Continuation of application No. 12/606,582, filed on Oct. 27, 2009, now Pat. No. 8,244,927.

(51) Int. Cl.
  *G06F 3/00* (2006.01)
  *G06F 13/00* (2006.01)

(52) U.S. Cl.
  USPC .......... 710/15; 710/5; 710/8; 710/10

(58) Field of Classification Search
  None
  See application file for complete search history.

(56) References Cited

U.S. PATENT DOCUMENTS

| | | | |
|---|---|---|---|
| 7,565,458 | B2 | 7/2009 | Thijssen et al. |
| 8,230,126 | B2 | 7/2012 | Siulinski |
| 8,244,927 | B2 | 8/2012 | Chadbourne et al. |
| 2006/0147059 | A1* | 7/2006 | Tang et al. .......... 381/104 |
| 2008/0150512 | A1 | 6/2008 | Kawano |
| 2008/0318629 | A1 | 12/2008 | Inha et al. |
| 2009/0198841 | A1 | 8/2009 | Yoshida et al. |
| 2011/0099298 | A1 | 4/2011 | Chadbourne et al. |
| 2011/0099300 | A1 | 4/2011 | Siulinski |
| 2012/0198183 | A1 | 8/2012 | Wetzel et al. |

FOREIGN PATENT DOCUMENTS

KR   20110046361 A   5/2011

OTHER PUBLICATIONS

"U.S. Appl. No. 12/606,562, Response filed Jan. 3, 2012 to Final Office Action mailed Oct. 28, 2011", 7 pgs.
"U.S. Appl. No. 12/606,562, Response filed Sep. 13, 2011 to Non Final Office Action mailed Jun. 22, 2011", 9 pgs.
"U.S. Appl. No. 12/606,562, Final Office Action mailed Oct. 28, 2011", 10 pgs.
"U.S. Appl. No. 12/606,562, Non Final Office Action mailed Jun. 22, 2011", 9 pgs.

(Continued)

*Primary Examiner* — Scott Sun
(74) *Attorney, Agent, or Firm* — Schwegman Lundberg Woessner P.A.

(57) ABSTRACT

A detection circuit can be configured to receive a digital value from an identification register and to determine a resistance at a conducting terminal of an audio or video jack plug using the digital value. The detection circuit can include a current source that outputs a current according to the digital value from the identification register and a comparator that compares a reference voltage to a voltage created by the current source across the resistance at the conducting terminal of the audio or video jack plug. A control logic circuit can be configured to store the digital value in the identification register, generate an interrupt signal to cause a processor to read the digital value, and identify a function of an accessory device including the audio or video jack plug, when the detection circuit determines the resistance at the conducting terminal of the audio or video jack plug.

19 Claims, 6 Drawing Sheets

OTHER PUBLICATIONS

"U.S. Appl. No. 12/606,562, Notice of Allowance Mailed Jan. 27, 2012", 7 pgs.

"U.S. Appl. No. 12/606,562, Response to Rule 312 Communication mailed May 29, 2012", 1 pgs.

"U.S. Appl. No. 12/606,562, Response to Rule 312 Communication mailed Jul. 2, 2012", 2 pgs.

"U.S. Appl. No. 12/606,582, Final Office Action mailed Dec. 8, 2011", 10 pgs.

"U.S. Appl. No. 12/606,582, Non Final Office Action mailed Jul. 14, 2011", 8 pgs.

"U.S. Appl. No. 12/606,582, Notice of Allowance mailed Apr. 12, 2012", 8 pgs.

"U.S. Appl. No. 12/606,582, Response filed Mar. 6, 2012 to Final Office Action mailed Dec. 8, 2011", 10 pgs.

"U.S. Appl. No. 12/606,582, Response filed Sep. 28, 2011 to Non Final Office Action mailed Jul. 14, 2011", 10 pgs.

"Chinese Application Serial No. 201220044818.X, Notification to Make Rectification mailed Jul. 17, 2012", 1 pg.

"USB OTG Mechanical Presentation", [Online] Retrieved from the Internet on Jun. 3, 2011 http://www.usb.org/developers/onthego/london/OTG_mechanical.pdf, (Feb. 26, 2002), 27 pgs.

"USB Remote Cable", [Online]. Retrieved from the Internet: <URL: http://chdk.wikia.com/wiki/USB_Remote_Cable>, (Jun. 9, 2009), 4 pgs.

Mehta, Arpit, "Keep Power Consumption in Check with Low-Power Comparators that Autosense Plugged-In Accessories", [Online]. Retrieved from the Internet: <URL: http://www.maxim-ic.com/appnotes.cfm/an_pk/4327>, (Feb. 27, 2009), 6 pgs.

* cited by examiner

DETECTING ACCESSORIES ON AN AUDIO OR VIDEO JACK

RELATED APPLICATION

This application is a continuation of and claims the benefit of priority under 35U.S.C. §120 to U.S. patent application Ser. No. 12/606,582, filed on Oct. 27, 2009, which is hereby incorporated by reference herein in its entirety.

BACKGROUND

Many types of electronic devices are available for providing management of personal information and for providing personal media entertainment. Some of these devices play audio media and video media such as slide shows, music, movies, and other video programs. Examples, include a personal computer, a personal data assistant, an MP3 player, and a cell phone. Users may want different device capabilities based on the type of media involved and may want to mix and match accessories with the media players. To provide the accessories the users may need a basic level of sophistication to determine device compatibility and to get different devices to interact.

OVERVIEW

This document relates generally to systems and methods for automatically detecting a device when it is connected to a host device, and in particular, to detecting the presence and type of an accessory device from the interconnection with the host device.

An apparatus example includes an audio or video jack connector configured to receive an audio or video jack plug of a separate device, a detection circuit in electrical communication with the connector, and a processor communicatively coupled to the detection circuit. The connector includes an electrical contact for connection to a conducting terminal of the plug. The detection circuit is configured to determine a resistance at the conducting terminal. The resistance is a resistive load of the separate device at the conducting terminal of the plug. The processor is configured to identify a function of the separate device according to the determined resistance, and configure an operation of the apparatus according to the determined function.

A method example includes detecting that an audio or video jack plug of a first device is inserted into an audio or video jack connector of a second device, determining a resistance at at least one conducting terminal of the plug using the second device, identifying, using the second device, a function performable by the first device according to the resistance at the at least one conducting terminal, and configuring the second device according to the identified function performable by the first device.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This document relates generally to systems and methods for automatically detecting the presence and type of an accessory device when it is connected to a host device. One type of interconnection between an accessory device and a host device is an audio jack connector or a video jack connector.

Figure 1:
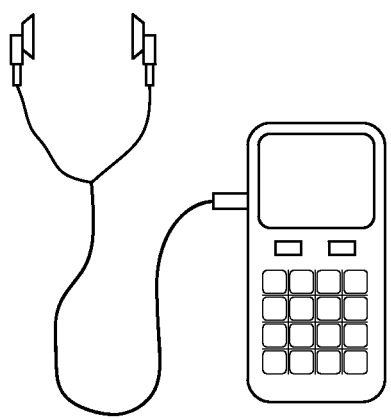
FIG. 1 is an illustration of an example of an audio and/or video jack plug.
Figure 1:
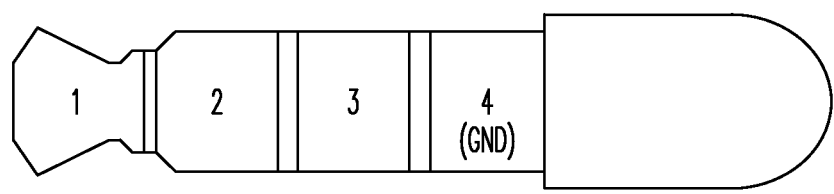

FIG. 1 is an illustration of an example of a jack plug of an audio jack or a video jack connector. An audio or video jack connector is sometimes called a TRS connector. The letters "TRS" stand for tip, ring and sleeve conducting terminals. In some examples, an audio or video jack connector may be a TS connector having only the tip and sleeve conducting terminals. In the example shown in FIG. 1, the audio or video jack connector has four conducting terminals and can be called a TRRS connector for the tip, ring, ring, and sleeve connections.

A jack plug can be included as part of several types of devices, such as a headset, a microphone, and an audio visual (A/V) cable. These devices are typically accessory devices plugged into a host device such as a media player or computing device. A user would have to program or otherwise configure the host device uniquely for each type of accessory device that was plugged into the host device. It would be convenient for the user if the host device was able to automatically recognize the type of device plugged into the audio jack or a video jack connector.

Table 1 shows an example of a signal map for a four terminal jack plug such as the jack plug shown in FIG. 1. For instance, as shown in the top row, if the accessory device is a stereo headset with a microphone (MIC), terminals 1 and 2 of the plug may be used for left audio and right audio respectively and terminal 3 may be used for the microphone connection. The signals are referenced to terminal 4 (e.g., ground).

The terminals of a jack plug will be connected to different types of circuits based on the function of the accessory device. Because of these different circuits, the impedance measured at the terminals of the jack plug will have different values depending on the function of the accessory device.

TABLE 1

| Accessory Device | Terminal 1 | Terminal 2 | Terminal 3 | Terminal 4 |
|---|---|---|---|---|
| Stereo Headset with MIC | Left Audio | Right Audio | MIC | GND |
| Mono Headset with MIC | Mono Audio | Mono Audio | MIC | GND |
| Standard 3.5 mm Headset | Left Audio | Right Audio | GND | GND |
| A/V Cable | Left Audio | Right Audio | Video | GND |

Table 2 shows an example of how impedances measured at the terminals can be used to determine the type of accessory device plugged into the audio jack connector or the video jack connector. For instance, if impedance measured at terminals 1 or 2 is approximately 600 ohms (Ω) or less, the accessory device includes a headset. If measured impedance determines that terminals land 2 are shorted together, the headset is a mono-headset. Similarly, if the impedance measured at terminal 3 is about 75Ω, the accessory device includes a television. If the impedance at terminal 3 is approximately in the range of 1.1 kΩ-2.2 k Ω, the accessory device includes a microphone. Multiple resistances may used to indicate multiple functions of the accessory device, such as headset with a microphone indicated by terminals 1 and/or 2, and terminal 3.

Measured impedance can also be used to determine the presence of the jack plug. For instance, a jack plug can be detected when the impedance of any of the terminals has a value less than 500 kΩ. In another example, a jack plug can be detected when the impedance of any of the terminals has a value less than 10 kΩ.

TABLE 2

| Terminal No. | Impedance Measured | Device ID |
|---|---|---|
| 1 and 2 | 600 Ω or less | Headset |
|  | 1 and 2 shorted | Mono Headset |
|  | 1 and 2 not shorted | Stereo Headset |
| 1 and 2 | Greater than 500 kΩ | Open |
| 3 | GND | Short - SEND/END press Or Standard Headset |
| 3 | 75 Ω | TV |
| 3 | 1 kΩ to 2.2 kΩ | Microphone |
| 3 | 4 kΩ to 500 kΩ | Button Press Options |
| 3 | Greater than 500 kΩ | Open |

Figure 2:
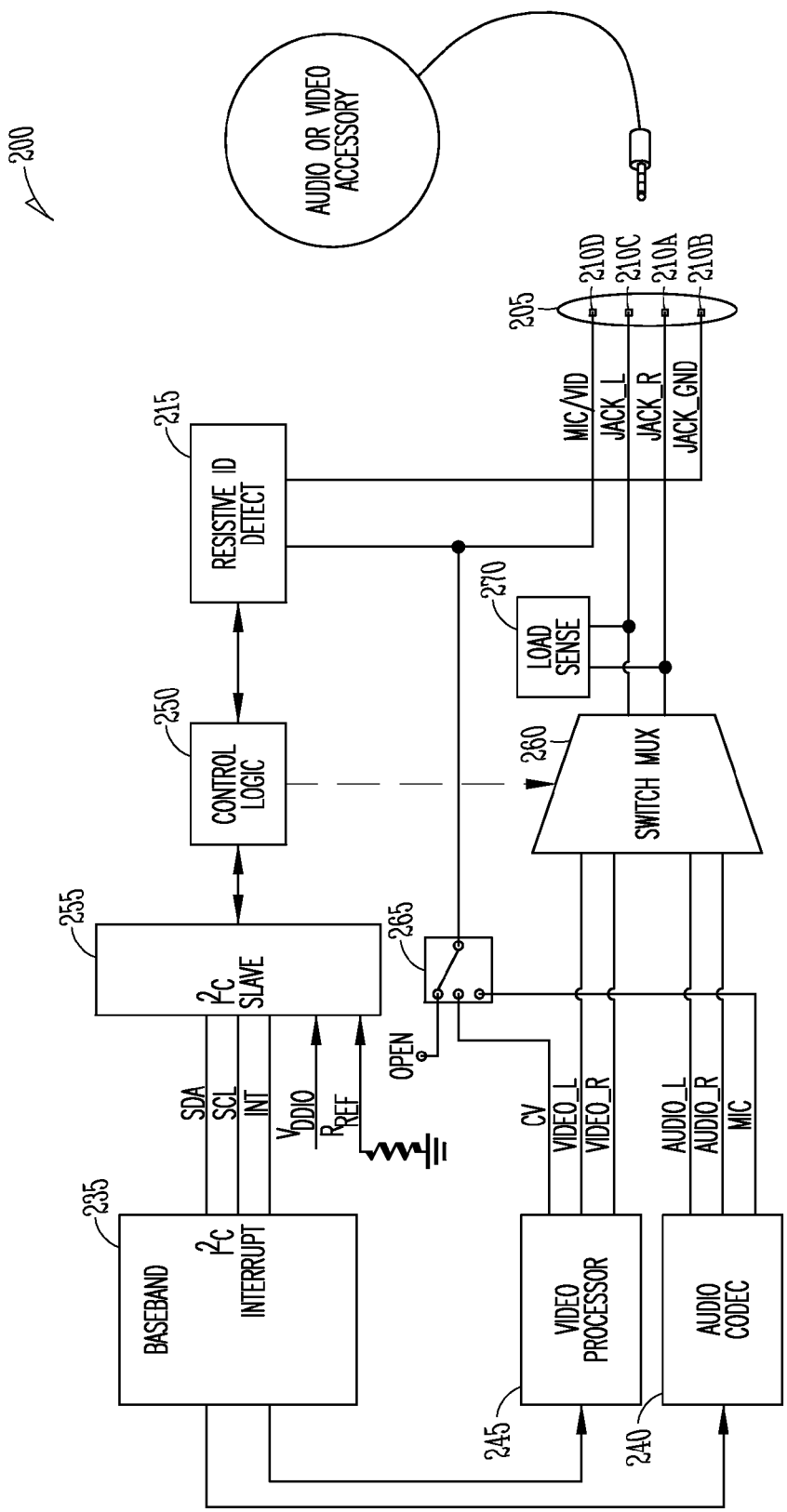
FIG. 2 shows a block diagram of portions of an example of a device to automatically detect the presence and type of an accessory device to which it is connected.

FIG. 2 shows a block diagram of portions of an example of a device 200 to automatically detect the presence and type of an accessory device that is connected to it. The device 200 includes an audio or video jack connector 205 that receives an audio or video jack plug of the separate accessory device. The connector 205 includes an electrical contact for connection to a conducting terminal of the plug.

In certain examples, the connector 205 includes two electrical contacts 210A and 210B to receive a TS type connector plug. In certain examples, the connector 205 includes three electrical contacts 210A, 210B, and 210C to receive a TRS type connector plug. In certain examples, the connector 205 includes four electrical contacts 210A, 210B, 210C, and 210D to receive a TRRS type connector plug.

The device also includes a detection circuit 215 in electrical communication with the connector 205. The detection circuit 215 determines a resistance or impedance at one or more conducting terminals of jack plug. The resistance determined is a resistive load of the separate accessory device seen at the conducting terminal of the plug, and not merely the resistance of the conducting terminal.

Figure 3:
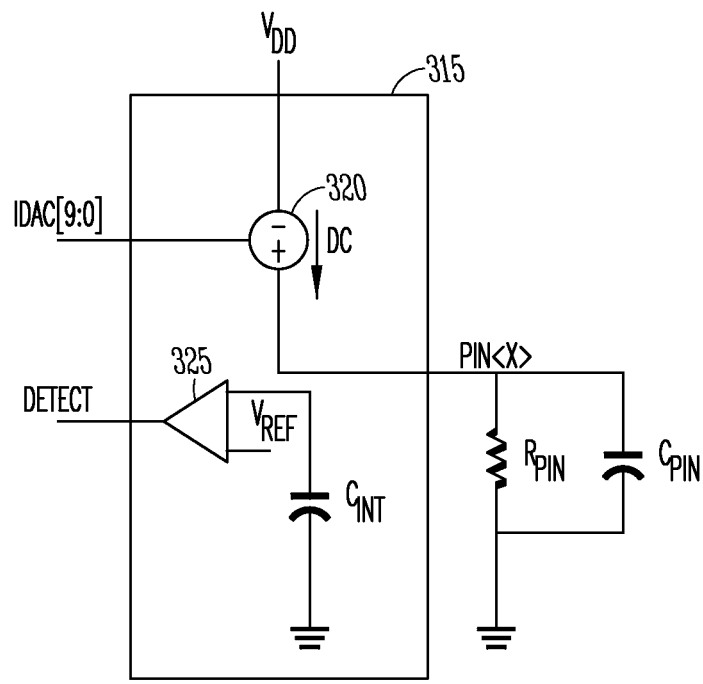
FIG. 3 is a block diagram of portions of an example of a detection circuit.
Figure 3:
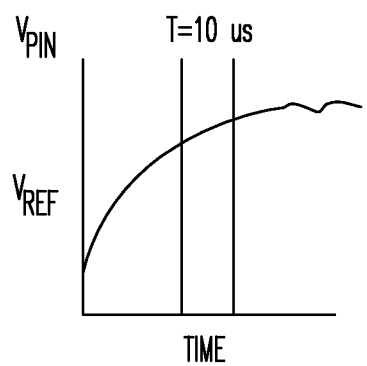

FIG. 3 is a block diagram of portions of an example of a detection circuit 315. The resistor and capacitor $R_{PIN}$ and $C_{PIN}$ represent the impedance seen at a conducting terminal of a jack plug. The detection circuit 315 also includes a controllable current source 320 and a comparator 325. The current source 320 outputs (e.g., sources or sinks) a current that is proportional to the digital value (idac[9:0]) of an identification register. To determine the resistance of a conducting terminal, the detection circuit 315 changes (e.g., increases) the digital value of the register and provides the proportional current to $R_{PIN}$ to create a voltage $V_{PIN}$ at an input of the comparator 325. When $V_{PIN}$ is approximately equal to $V_{REF}$, a detect signal is generated by the detection circuit. The value of $R_{PIN}$ is determined from the known value of $V_{REF}$ and the current value that corresponds to the digital value in the identification register.

The combined capacitance seen at the conducting terminal is the conduction terminal capacitance $C_{PIN}$ and the internal capacitance of the connection $C_{INT}$. Because of this capacitance, there is a time constant associated with the voltage $V_{PIN}$ reaching its final value. The time for $V_{PIN}$ to reach 50% of its final value is $0.7 R_{PIN}*(C_{PIN}+C_{INT})$. The detection circuit 315 allows enough time for $V_{PIN}$ to stabilize between measurements before changing the value of the identification register. In certain examples, the same detection circuit 315 is used to determine the resistance of multiple conducting terminals, such as by using a switch circuit to switch different terminals to the detection circuit input. In certain examples, a different detection circuit 315 is included for each conducting terminal.

Returning to FIG. 2, the device 200 also includes a processor 235 communicatively coupled to the detection circuit. The communicative coupling allows signals to be communicated to the processor 235 from the detection circuit 215 even though there may be intervening circuitry. In some examples, the processor 235 is a microprocessor. In some examples, the processor 235 is application specific integrated circuit (ASIC). The processor 235 executes instructions in software and/or firmware to perform the function described herein. The software and/or firmware are contained in modules. One or more functions may be performed by a module.

The processor 235 identifies a function of the separate accessory device according to the determined resistance. In certain examples, if the detection circuit 215 is the detection circuit 315 of FIG. 3, the processor 235 identifies a function of the separate device according to the value of the identification register. The processor 235 then configures operation of the device 200 according to the determined function.

For instance, the connector 205 may include a first electrical contact 210A for connecting to a first conducting terminal of the plug, and a second electrical contact 210C for connecting to a second conducting terminal of the plug. Using the examples in Table 2, if the processor determines that a measured resistance of one or more of the two conducting terminals is 600Ω, then the accessory device includes a headset and the processor 235 configures the device to provide audio signals to the conducting terminals. If the processor 235 determines that the electrical contacts are shorted together (e.g., by connecting the electrical contacts to the inputs of the detection circuit 215) then the accessory device is identified as a mono-headset. If the processor 235 determines that the electrical contacts are not shorted together, then the accessory device is identified as a stereo-headset and the processor 235 provides stereo audio signals to the conducting terminals.

In some examples, the device 200 includes a media player. The processor 235 is a baseband processor and the device 200 includes an audio codec module 240. The processor 235 configures the audio codec module 240 according to the determined function of the separate accessory device. In certain examples, the processor 235 configures the audio codec module 240 to provide mono or stereo audio signals to the conducting terminals of the plug according to whether the determined function is mono audio or stereo audio.

The device 200 is not limited to only providing audio information. In some examples, the processor 235 may determine that the accessory device includes a microphone (e.g., by measuring a resistance in the range of 1 kΩ to 2.2 kΩ at a third conducting terminal in the example of Table 2). The processor 235 configures the audio codec module 240 to receive audio signals from the conducting terminals of the plug according to the measured resistance.

The functions detected by the device 200 are not limited to audio functions. The accessory device may include a video display or monitor. In some examples, the device 200 includes a video processor 245. The processor 235 may determine that the accessory device includes video capability (e.g., by measuring a resistance of approximately 75Ω at a third conducting terminal in the example of Table 2). The processor 235 configures the video processor 245 to provide video information to a conducting terminal of the plug.

Figure 4:
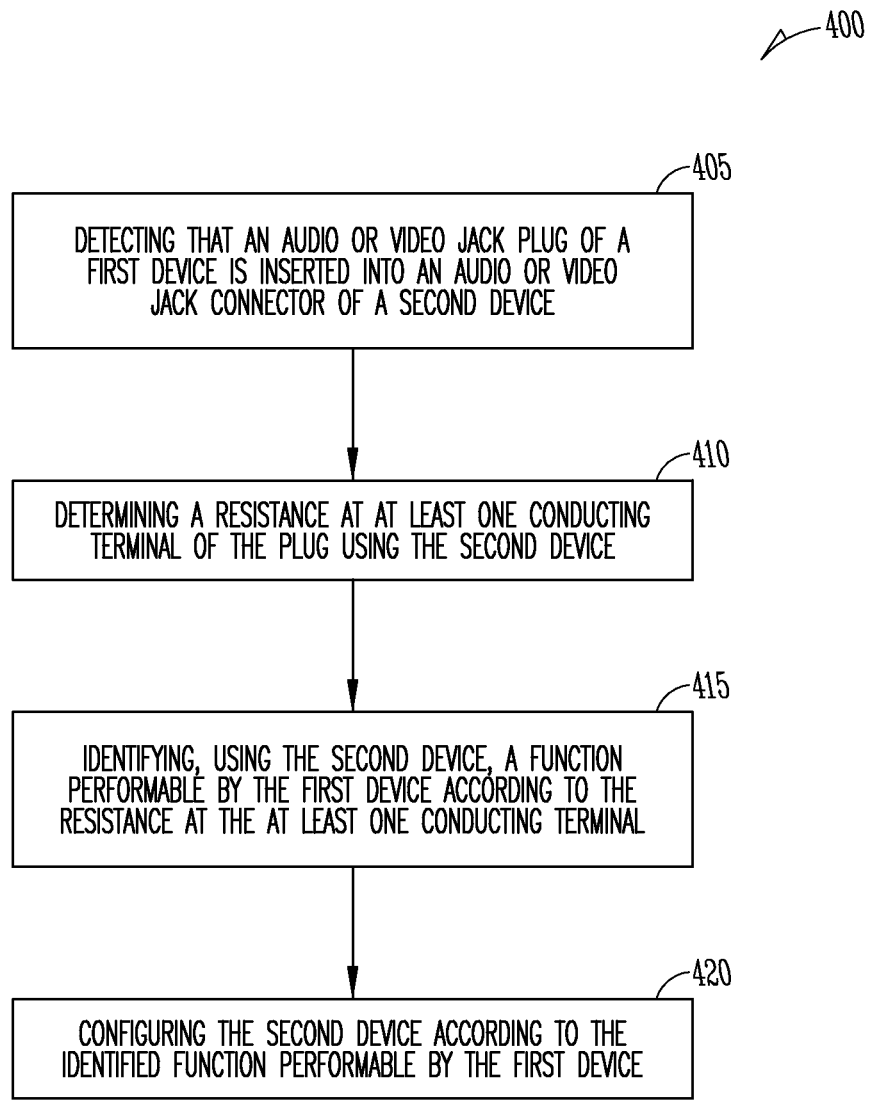
FIG. 4 is a flow diagram of an example of a method for automatically detecting the presence of an accessory device when it is connected to a host device.

FIG. 4 is a flow diagram of an example of a method 400 for automatically detecting the presence of an accessory device when it is connected to a host device. At block 405, an audio or video jack plug of a first device is detected when inserted into an audio or video jack connector of a second device. In this way, the second device automatically detects the presence of the first device. In some examples, this may include detecting that the connector of the second device is no longer seeing an open circuit at its electrical contact or contacts. In certain examples, this occurs when current in the detection circuit begins flowing due to presence of a conducting terminal and creates a voltage $V_{PIN}$ less than a threshold voltage (e.g., $V_{REF}$).

At block 410, a resistance at at least one conducting terminal of the plug is determined using the second device. The resistance includes a resistive load of the first device measurable at the conducting terminal of the plug. At block 415, a function performable by the first device is identified by the second device according to the resistance at the at least one conducting terminal. At block 420, the second device automatically configures itself according to the identified function performable by the first device.

Returning to FIG. 2, according to some examples, the device 200 includes control logic circuit 250 communicatively coupled to the processor 235. The processor 235 uses the control logic circuit 250 to configure the device 200 such as by changing the state of switches in the device 200. In some examples, the control logic circuit 250 communicates information with the processor 235 using an inter-integrated circuit protocol ($I^2C$). The device 200 includes an $I^2C$ slave module 255 for communicating with the processor 235.

Figure 5:
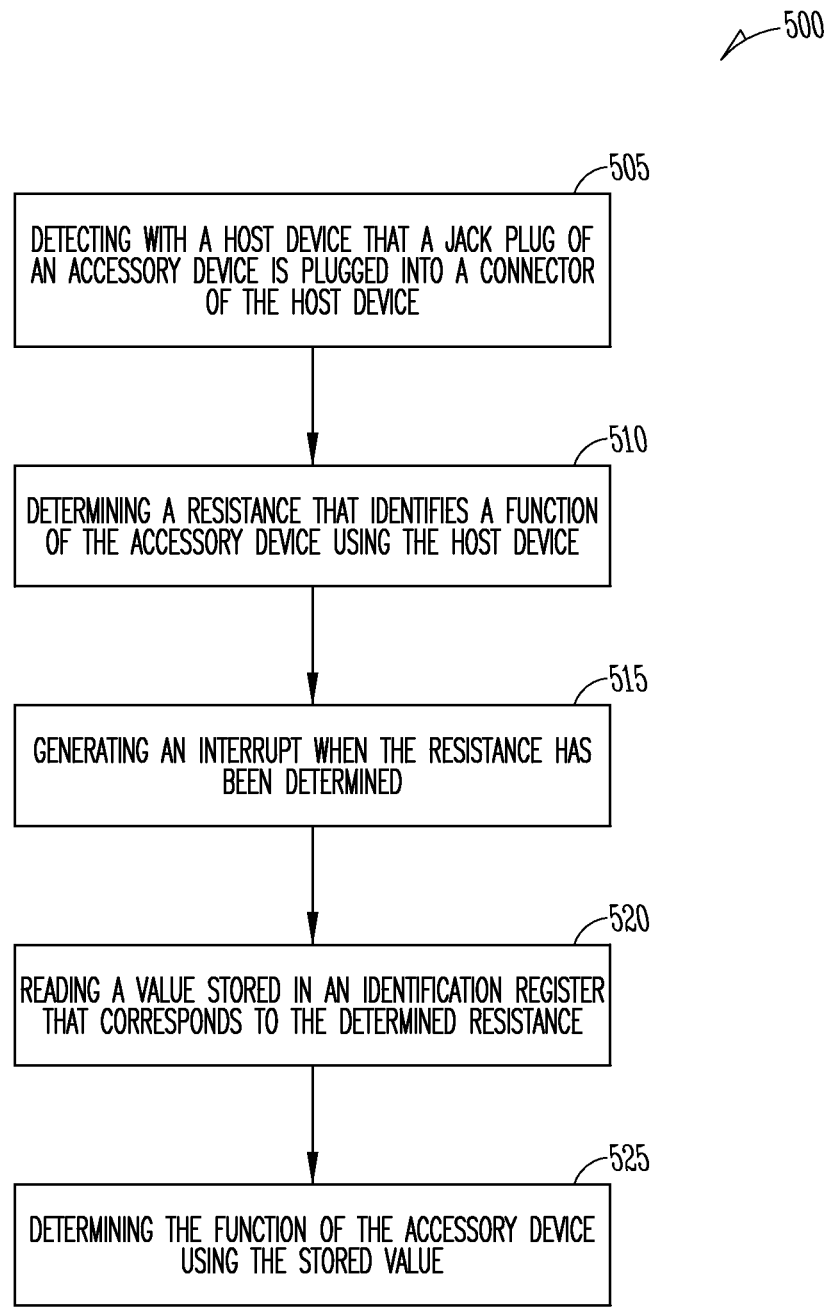
FIG. 5 is a flow diagram of another example of a method for automatically detecting the presence of an accessory device when it is connected to a host device.

FIG. 5 is a flow diagram of another example of a method 500 for automatically detecting the presence of an accessory device when it is connected to a host device. At block 505, the device 200 of FIG. 2 detects from measured impedance that a user has plugged an audio or video jack plug of an accessory device into the connector of the device 200.

At block 510, the resistance that identifies a function of the accessory device is determined. In some examples, the control logic circuit 250 changes the digital value of an identification to change the measuring current used by the detection circuit 215. When the detect signal is received from the detection circuit 215, the value stored in the identification register of the control logic circuit 250 indicates the function.

At block 515, the control logic circuit 250 generates an interrupt to the processor when the resistance has been determined by the detection circuit 215. The interrupt may be sent using the $I^2C$ protocol via the $I^2C$ slave module 255. At block 520, the processor 235 reads a value in the identification register. In certain examples, the processor 235 reads the identification register from the $I^2C$ slave module 255.

At block 525, the processor 235 determines (e.g., reads) the function of the accessory device using the value in the identification register. For example, the processor 235 may determine that the accessory device includes a headset, a stereo headset, a microphone, or a video display. The processor 235 then configures the device 200 according to the identified accessory device function. For instance, if the processor 235 determines that the accessory device is a headset, the processor 235 configures the control logic circuit 250 to switch audio information to the conducting terminals such as by switch multiplexer 260 for example. If the processor 235 determines that the accessory device displays video, the processor 235 configures the control logic circuit 250 to switch video information to the conducting terminals, such as by switch 265 for example. If the processor 235 determines that the accessory device includes a microphone, the processor 235 configures the control logic circuit 250 to route audio information from the conducting terminals to the audio codec module 240, such as by switch 265 for example.

According to some examples, the accessory device may be able to change the resistance seen at one or more of the conducting terminals. For instance, the accessory device may include a switch to change the resistance at a conducting terminal of the jack plug when the switch is activated by a user, such as by a button press for example. In some examples, the resistance at the conducting terminal only changes while the user activates the switch (e.g., depresses the button).

In some examples, the detection circuit 215 first determines the resistance seen at a conducting terminal of the jack plug and then detects the change in the determined resistance. As a result of detecting the change, a processor interrupt is generated by the control logic circuit 250. In certain examples, the processor receives a value indicative of the determined resistance in relation to the interrupt, such as from an identification register for example. The processor 235 changes an operation of the device 200 in response to the detected change in the resistance. In certain examples, the processor 235 initiates an operation identified according to the received value.

As an illustrative example, assume that, an initial resistance determined by the detection circuit 215 identifies an accessory device as including a headset. The resistance then changes from this initial resistance and the detection circuit 215 provides a value of the resistance to the processor 235. Based on the resistance value, the processor 235 then initiates an operation of the device 200 based on the value, such as stop, play, rewind, or fast forward. A non-exhaustive list of possible examples of resistances for such operations include 4 kΩ for stop, 5.62 kΩ for play, 7.87 kΩ for rewind, and 11 kΩ for fast forward. Other operations may include pause, skip, back, and volume up or down. In another example, the accessory device includes a video display or monitor and the operation includes menu operations, such as select, skip, play, fast forward and the like.

Different resistance values may be switched on to one or more conducting terminals to identify different operations for the same accessory device. In some examples, multiple keys of a headset with a keypad can be monitored. This may be useful for controlling a media player of the host device. In certain examples, the resistance change is only evident while the user depresses a button and returns to an original resistance when the button is no longer pressed. The device 200 may detect that a switch is stuck by monitoring the amount of time the change in resistance is evident.

In some examples, the device 200 includes a sense circuit 270 communicatively coupled to the control logic circuit 250 to detect presence of the plug. The detection circuit 215 detects a change in the resistance at the conducting terminal while the sense circuit 270 detects that the plug remains connected. The processor 235 then initiates an operation of the apparatus according to the detected change in resistance.

Figure 6:
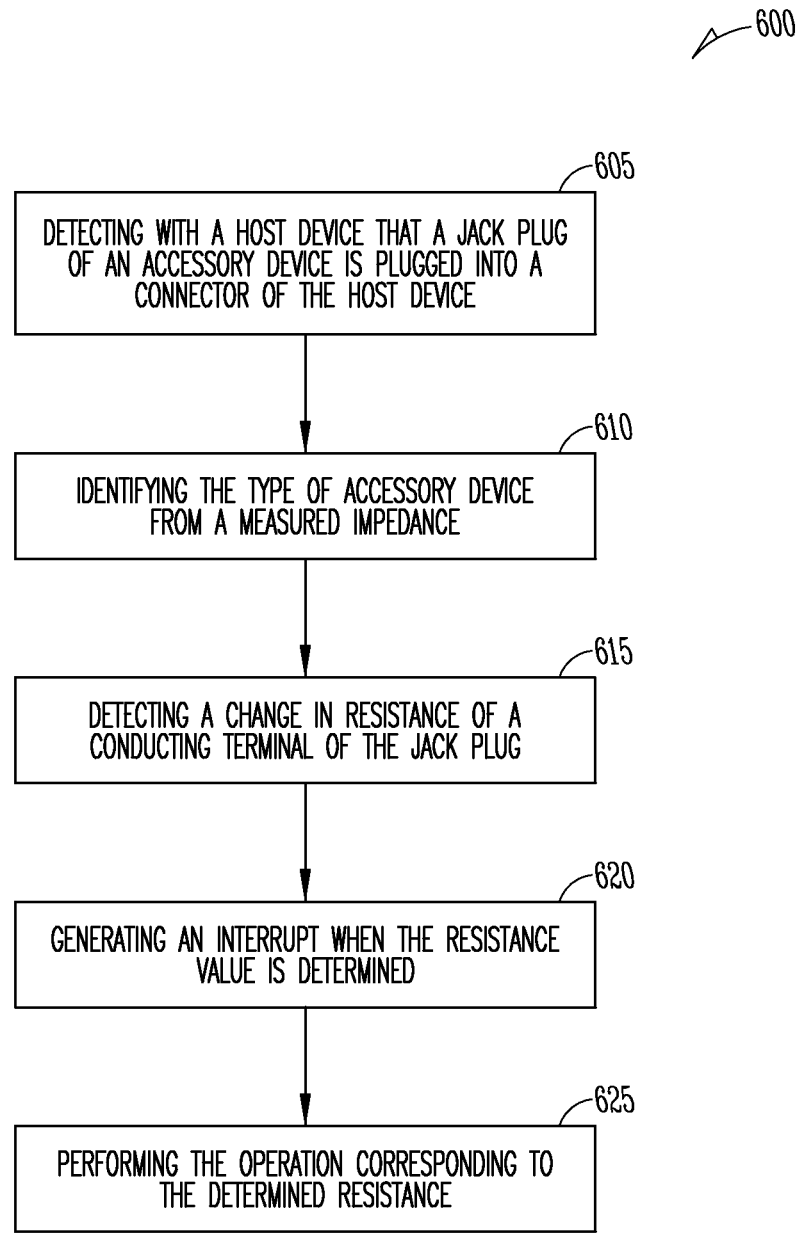
FIG. 6 is a flow diagram of an example of a method for automatically detecting the presence of an accessory device when it is connected to a host device and for identifying requested host device operations.

FIG. 6 is a flow diagram of an example of a method 600 for automatically detecting the presence of an accessory device when it is connected to a host device and for identifying requested device operations. At block 605, the device 200 of FIG. 2 detects from measured impedance that a user has plugged an audio or video jack plug of an accessory device into the connector of the device 200. The measured impedance is seen at a conducting terminal of the jack plug, and at block 610, the host device identifies the type of accessory device by the impedance.

At block 615, the detection circuit 215 detects a change in resistance of a conducting terminal of the jack plug. The change may be at the same conducting terminal used to identify the device or the impedance change may be seen at a different conducting terminal of the jack plug. The change may be due to the user pushing a button on the accessory device or from the user activating a switch on the cable or wire attached to the jack plug.

At block 620, an interrupt is generated when the resistance value is determined. The interrupt may be sent to the processor 235 of the device 200 using an I$^2$C protocol. The processor 235 then reads the value corresponding to the resistance, such as by reading an identification register.

At block 625, the processor 235 identifies the operation corresponding to the resistance caused by the button press or switch activation. The processor 235 then initiates the operation. When the operation completes, the device waits for the next resistance change that signals the next device operation. It can be seen that this impedance monitoring allows the host device to detect the type of accessory plugged in so the host device can configure itself appropriately and allows the host device to continue to check for changes in status of the accessory device.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times. These computer-readable media can include, but are not limited to, hard disks, removable magnetic disks, removable optical disks (e.g., compact disks and digital video disks), magnetic cassettes, memory cards or sticks, random access memories (RAM's), read only memories (ROM's), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An electronic circuit comprising:
   a detection circuit configured to receive a digital value from an identification register and to determine a resistance at a conducting terminal of an audio or video jack plug using the digital value; and
   a control logic circuit configured to store the digital value in the identification register and to generate an interrupt signal to cause a processor to read the digital value, to identify a function of an accessory device including the audio or video jack plug, when the detection circuit has determined the resistance at the conducting terminal of the audio or video jack plug.

2. The electronic circuit of claim 1, wherein the detection circuit is configured to provide a detection signal when the resistance at the conducting terminal has been determined using the digital value.

3. The electronic circuit of claim 1, wherein the detection circuit is configured to detect a change in the determined resistance at the conducting terminal.

4. The electronic circuit of claim 1, including:
a sense circuit configured to detect the presence of the audio or video jack plug in an audio or video jack coupled to the electronic circuit,
wherein the detection circuit is configured to determine the resistance at the conducting terminal of the audio or video jack plug when the sense circuit detects the presence of the audio or video jack plug in the audio or video jack.

5. The electronic circuit of claim 1, wherein the detection circuit includes:
a current source configured to output a current according to the digital value from the identification register; and
a comparator configured to compare a reference voltage to a voltage created by the current source across the resistance at the conducting terminal of the audio or video jack plug,
wherein the detection circuit is configured to determine the resistance at the conducting terminal of the audio or video jack plug using an output of the comparator.

6. The electronic circuit of claim 1, including:
an inter-integrated circuit (I2C) protocol module configured to communicate the interrupt signal and the stored digital value between the control logic circuit and the processor.

7. The electronic circuit of claim 1, wherein the control logic circuit is configured to change the digital value from the identification register until the detection circuit has determined the resistance at the conducting terminal of the audio or video jack plug.

8. The electronic circuit of claim 1, including:
a switch multiplexer comprising inputs and outputs, the switch multiplexer coupled to the control logic circuit, the switch multiplexer configured to:
receive control signals from the control logic circuit; and
switch signals received on the inputs to the outputs based on the received control signals.

9. The electronic circuit of claim 1, wherein the conducting terminal of the audio or video jack plug is one of a plurality of conducting terminals of the audio or video jack plug, and
wherein the electronic circuit includes:
a switch circuit configured to switch each of the plurality of conducting terminals to an input of the detection circuit to determine a resistance at a respective one of the plurality of conducting terminals.

10. The electronic circuit of claim 1, wherein the conducting terminal of the audio or video jack plug is one of a plurality of conducting terminals of the audio or video jack plug,
wherein the detection circuit is one of a plurality of detection circuits, and
wherein each of the plurality of detection circuits is configured to determine a resistance at a respective one of the plurality of conducting terminals.

11. An electronic circuit comprising:
a detection circuit configured to receive a digital value from an identification register, the detection circuit including:
a current source configured to output a current according to the digital value; and
a comparator configured to compare a reference voltage to a voltage created by the current source across a resistance at a conducting terminal of the audio or video jack plug,
wherein the detection circuit is configured to determine the resistance at the conducting terminal of the audio or video jack plug using an output of the comparator and to provide a detection signal when the resistance at the conducting terminal has been determined.

12. The electronic circuit of claim 11, including:
a sense circuit configured to detect the presence of an audio or video jack plug in an audio or video jack coupled to the electronic circuit,
wherein the detection circuit is configured to determine the resistance at the conducting terminal of the audio or video jack plug when the sense circuit detects the presence of the audio or video jack plug in the audio or video jack.

13. The electronic circuit of claim 11, including:
a control logic circuit configured to store the digital value in the identification register and to generate an interrupt signal to cause a processor to read the digital value, to identify a function of an accessory device including the audio or video jack plug, when the detection circuit has determined the resistance at the conducting terminal of the audio or video jack plug.

14. A method comprising:
receiving a digital value from an identification register;
determining a resistance at a conducting terminal of an audio or video jack plug using the digital value; and
generating an interrupt signal to cause a processor to read the digital value, to identify a function of an accessory device including the audio or video jack plug, when the resistance at the conducting terminal of the audio or video jack plug has been determined.

15. The method of claim 14, including:
providing a detection signal when the resistance at the conducting terminal has been determined using the digital value.

16. The method of claim 14, wherein the determining the resistance at the conducting terminal includes detecting a change in the resistance at the conducting terminal.

17. The method of claim 14, including:
detecting the presence of the audio or video jack plug in an audio or video jack coupled to the electronic circuit,
wherein the determining the resistance includes determining the resistance at the conducting terminal of the audio or video jack plug when the sense circuit detects the presence of the audio or video jack plug in the audio or video jack.

18. The method of claim 14, including:
generating a current according to the digital value from the identification register;
providing the current across the resistance at the conducting terminal of the audio or video jack plug; and
comparing a reference voltage to a voltage created by the current source across the resistance at the conducting terminal of the audio or video jack plug,
wherein the determining the resistance at the conducting terminal of the audio or video jack plug includes using the comparing.

19. The method of claim 14, including:
changing the digital value in the identification register until the detection circuit has determined the resistance at the conducting terminal of the audio or video jack plug.

* * * * *